United States Patent [19]
Walton, II

[11] Patent Number: 5,149,936
[45] Date of Patent: Sep. 22, 1992

[54] MULTI-PLANE BALANCING PROCESS AND APPARATUS USING POWDER METAL FOR CONTROLLED MATERIAL ADDITION

[75] Inventor: James F. Walton, II, Ballston Lake, N.Y.

[73] Assignee: Mechanical Technology Incorporated, Latham, N.Y.

[21] Appl. No.: 683,333

[22] Filed: Apr. 10, 1991

[51] Int. Cl.$^5$ ............................................. B23K 26/00
[52] U.S. Cl. ........................... 219/121.65; 219/121.82
[58] Field of Search ...................... 219/121.15, 121.16, 219/121.17, 121.65, 121.66, 121.82

[56] References Cited

U.S. PATENT DOCUMENTS

| | | | |
|---|---|---|---|
| 3,996,883 | 12/1976 | Gusarov et al. | 118/8 |
| 4,243,867 | 1/1981 | Earl et al. | 219/121.63 |
| 4,323,756 | 4/1982 | Brown et al. | 219/121.66 |

Primary Examiner—C. L. Albritton
Attorney, Agent, or Firm—Kane, Dalsimer, Sullivan, Kurucz, Levy, Eisele and Richard

[57] ABSTRACT

The method and apparatus for balancing an object dynamically includes rotating the object continuously, depositing material on the object and melting the surface of the object and the material to form a metallurgical bond. The amount of material to be added is calculated using influence coefficients. The additive material may be either in form of a powder entrained in a gas stream, a solid rod or in capsules.

11 Claims, 3 Drawing Sheets

MULTI-PLANE BALANCING PROCESS AND APPARATUS USING POWDER METAL FOR CONTROLLED MATERIAL ADDITION

FIELD OF INVENTION

This invention pertains to a procedure and apparatus to balance a rotor by addition of material with laser.

BACKGROUND OF THE INVENTION

Conventional rotor balancing methods were tedious and labor intensive. These methods comprised mounting the rotor on a balance machine, turning the rotor to find the imbalance locations, dismounting the rotor, grinding or drilling excess material away from the rotor and remounting the rotor to determine its balance. Since it was difficult to determine the amount of material removed, the whole operation had to be repeated many times and was frequently based on trial-and-error.

In commonly assigned U.S. Pat. No. 4,773,019, a microprocessor controlled laser system is disclosed in which a rotor is mounted on supports with vibration sensors. The sensors are coupled to the microprocessor for using a plurality of influence coefficients descriptive of the vibration changes caused when an amount of material is removed from a particular location on the rotor. A series of laser pulses are issued to remove material from the rotor as calculated by the microprocessor. However, in certain applications, removal of material from a rotor might not be feasible or advisable because, for example, it may weaken the rotor structurally.

OBJECTIVES AND SUMMARY OF THE INVENTION

An objective of the present invention is to provide a single system for checking the balance of a rotor and for balancing the same as required in a single load and spin-up cycle without removing the rotor from the balancing machine and by adding material to the rotor while spinning.

Another objective is to provide an automated system which can be used by an operator without special training by providing full automation of the process, with step-by-step instructions to the operator.

A further objective is to provide a rotor balancing system wherein a rotor can be balanced while maintaining its surface integrity and smoothness.

Yet another objective is to provide a system which can be readily incorporated into an existing balancing device.

Other objectives and advantages of the system shall become apparent from the following description of the invention. The system according to this invention includes a microprocessor-controlled laser and balance material supply system for adding material to the rotor, a rotor support for holding and turning the rotor, and sensors mounted on the support for dynamically measuring the vibrations of the rotor, and its rotational speed. The microprocessor collects data from the various sensors and generates the control signals for the positioning and operation of the laser, and positioning of a nozzle means for providing a material to be deported to a location on the rotor. The laser and nozzle are axially and radially movable with respect to the rotor so that excess material may be added along several balancing planes.

DETAILED DESCRIPTION OF THE INVENTION

Figure 1:
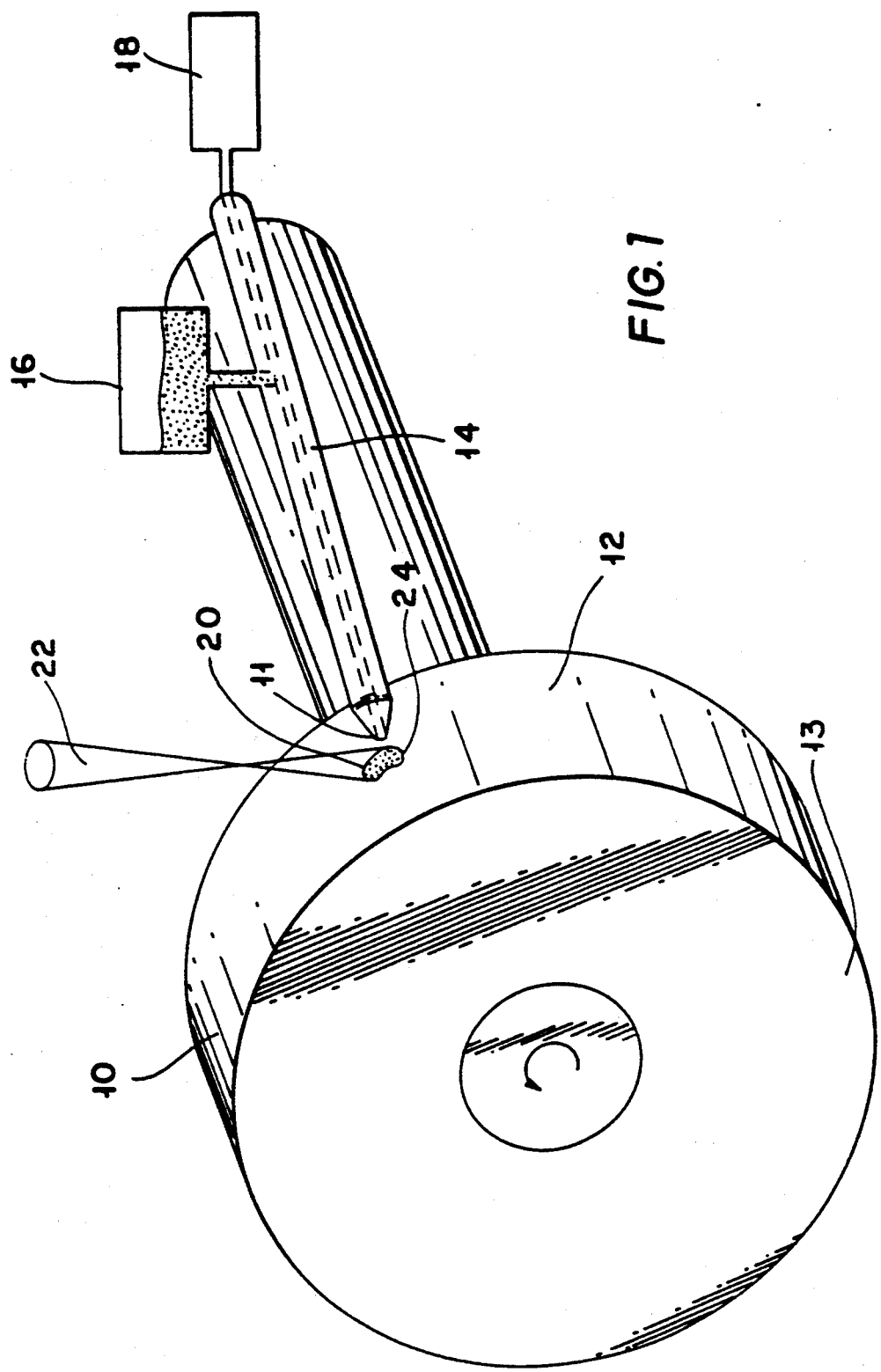
FIG. 1 shows a somewhat schematic orthogonol view of a rotor being balanced by a system constructed in accordance with this invention.

Referring now to the drawings, a rotor 10 is mounted for rotation about its longitudinal axis, and has both a cylindrical surface 12 and alternatively a circular face 13. Also provided is a nozzle assembly 14. Nozzle assembly 14 includes a reservoir 16 filled with a metal powder. The composition of the powder is selected so that it is compatible with the surface composition of the rotor. Nozzle assembly 14 also includes a pressurized gas source 18. The nozzle assembly is arranged and constructed so that when it is activated (as described more fully below) it emits a jet of gas from source 18 through an ejection port 11. The gas entrains metal powder from reservoir 16 which is deposited at a preselected zone 20 on surface 12. Alternatively, nozzle assembly 14 may incorporate wire feedstock in place of the powder. Simultaneously, a laser beam 22 is also directed at surface 12. Beam 22 is preferably slightly defocused so that it does not impinge on surface 12 at a single point but it covers substantially zone 20. Beam 22 melts the material deposited on surface 12 together with a portion of the rotor material itself to form a metallurgical bond thereon as at 24. Since this whole process takes place dynamically while the rotor 10 turns, beam 22 is in the form of a short pulse. The additional material deposited on the rotor is firmly anchored thereto even after it reaches room temperature. Other types of deposits, such as ones formed by using plasma deposition techniques may form a mechanical deposit which could separate and flake off the rotor, especially at high speeds. Alternatively, if some of the added material has to be taken off because too much material has been deposited, the laser beam could be tightly focussed and pulsed to remove virtually any amount of material to achieve the desired state of balance.

Figure 2:
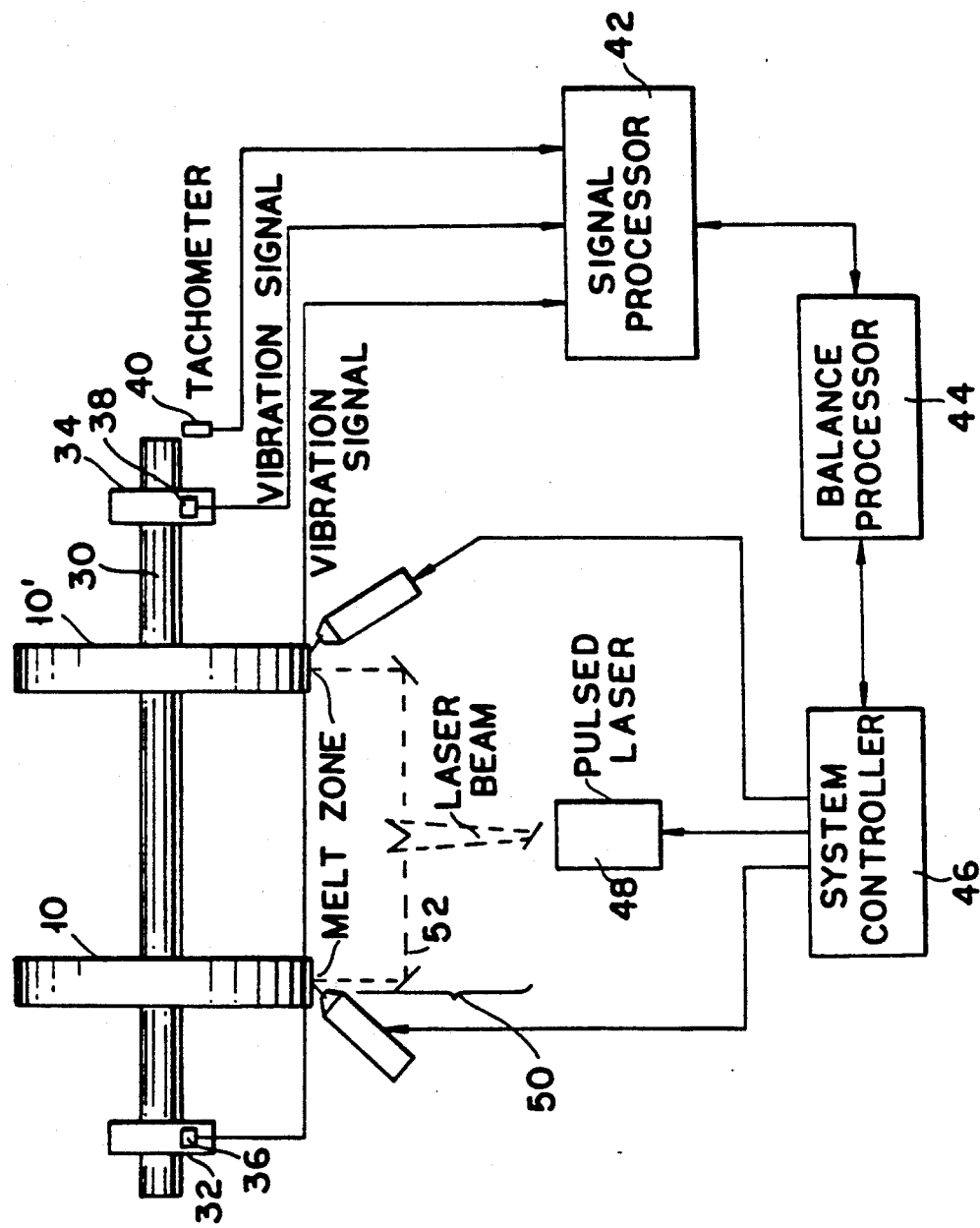
FIG. 2 shows a block diagram of the system of FIG. 1.

Referring now to FIG. 2, a complete balancing system may include a shaft system 30 with one, two or more rotor balance locations 10, 10'. The shaft system is rotatably mounted on one or two bearing pedestals 32, 34. The shaft 30 is also coupled to a motive means (not shown) for rotating the shaft. Also mounted on pedestals 32, 34 are vibration sensors 36, 38 respectively. Adjacent to one end of the shaft system 30 there is a tachometer 40 used to monitor the speed of rotation of shaft system 30, and to indicate its angular position.

The balancing system also includes a signal processor 42, a balance processor 44, a system controller 46, and a laser 48. The signal processor 42, balance processor 44 and system controller could be implemented in a single microcontroller. The signal processor receives the signals from the sensors 36, 38 and tachometer 40 and converts them for the use of the balance processor 44. Based on this information, the balance processor 44 determines the rotor imbalance using predetermined influence coefficients, as described in U.S. Pat. No.

4,773,019, incorporated herein by reference. Using coefficients, the balance processor determines where and how much material should be added to rotors 10, 10' to achieve a proper balance. (While U.S. Pat. No. 4,773,019 describes a technique to determine influence coefficients for removal of material, obviously the same technique can be used for adding material to the rotor).

The balancing system further includes two delivery nozzle 14, 14' assemblies and laser beam delivery system 50 for delivering the laser beam from laser 48. The delivery system 50 may include several mirrors, such as 52 for directing the beam to a selected melt zone. Alternatively fiber optic cables may be used for the same purpose. The laser beam delivery system 50 is coupled to system controller 46 for directing the laser beam at a preselected planes normal or longitudinal to the axis of rotation of rotor balance locations 10 or 10'.

Each of the nozzle assemblies includes a reservoir and a gas source as shown in FIG. 1 or alternatively a wire feed system and its ejection ports are axially and radially movable in parallel with shaft 30 by system controller 46. If the two rotor balance planes 10, 10' are the same then the reservoirs for the nozzle assemblies are filled with the same powder. For rotors having different materials, the reservoirs may contain different powders.

The balancing system of FIG. 2 operates as follows. First the shaft is rotated at a predetermined speed suitable for determining the influence coefficients and/or the imbalance magnitude and locations, required for balancing, hereinafter referred to as a calibrating step. Commonly this speed is in the range of 1000-2000 RPM. While the shaft system is turning at this speed, the vibration sensors disposed 36, 38 provide data for the balance processor for calculating the imbalance using influence coefficients. These coefficients then define one or more melt zones where material must be added to correct the balance of a particular rotor. Preferably, each melt zone is identified by a particular axial position or axial plane along shaft 30, and an angular position of the rotor (i.e. in cylindrical coordinates). This information is then sent to the system controller 46. The system controller in turns positions the laser delivery system and the nozzle ports to the requested axial positions and adjusts rotor speed to that necessary for proper material bonding. As the rotor turns, its angular position is monitored by tachometer 40. When the rotor balance planes 10, 10' are at the requested angular position, the nozzle assemblies release and eject the amount of powder requested by the controller toward the designated melt zone. Then the laser beam is activated to cause the released material to be melted and metallurgically bonded to at least one of the rotaries. Material may be deposited on the rotors simultaneously, or alternatively on each rotor.

If the calculations indicated that material must be added at several distinct locations, the laser beam delivery system 50 and nozzle assembly are repositioned to the next such zone, and the process is repeated. Once material has been added at all the melt zones (and additional at various intermediate times for more complicated balancing operations), the depositing process is halted, and the calibration step is repeated to check if the rotor is within certain preselected limits. If the addition of material was unsuccessful, the whole operation is repeated with new influence coefficients. This process continues for a plurality of locations on the rotors until the balance of the rotors is corrected.

Figure 3:
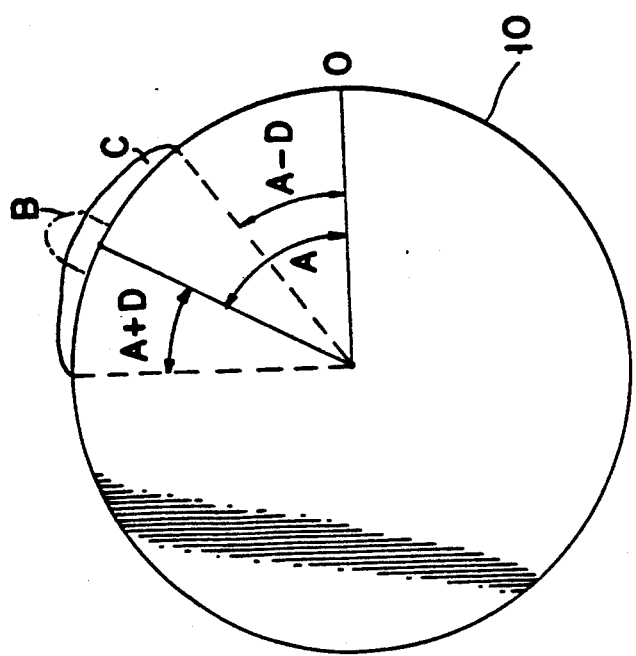
FIG. 3 shows a cross-sectional view of the rotor of FIG. 1.

The amount of material that can be deposited at any melt zone depends on a large number of factors including the size and composition of the rotor, the composition of the additive material, the speed of rotation of the rotor, the power and duration of the laser pulses, and so on. For most applications, the speed of rotation established for calibration may be too high for the deposition process. Therefore, before material is added to a rotor, its speed of rotation may be slowed down, for example to within a range of 10-100 RPM. However, even at low speeds, in some instances, calculations may show that a large amount of material must be added at a given melt zone which cannot be readily accomplished. For example for rotor 10, the calculations may show that a lump of additive material B weighing W grams may be required at a position defined by angle A as shown in FIG. 3, wherein the weight W may be outside the range of the laser system. Alternatively, the rotor may be turning too fast even when slowed down to be able to deposit and melt such a large amount of additive matter. In this situation, rather than depositing W grams of material at once, the controller 46 applies a plurality of deposits over an arc of circle extending at equal angles D on the two side of angle A. In this manner, rather than forming a single deposit B, a plurality of deposits are formed as indicated by C on rotor 10, extending over the arc from A—D to A+D, in the same axial plane. This arc, extending over an angle of 2D may have a range of 10°-60°. Of course the effect of these multiple deposits is equivalent to W grams located at angle A.

Figure 4:
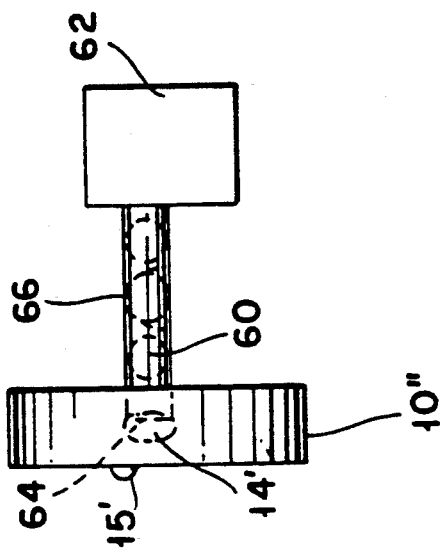
FIG. 4 shows an alternate embodiment for a material source.

Instead of a powder, the deposited material may be provided in the form of a rod or wire. For example, referring to FIG. 4, a wire or rod 60 may be used as a source of material to be added. This wire may be fed by a feeding mechanism 62. The feeding mechanism may be positioned to a specific location along rotor 10", instead of the nozzle port, in such a manner that the tip 64 of rod 60 is disposed directly on the edge of the melt zone 14'. A laser pulse then hits both the rotor surface and the tip 64 thereby melting an amount of material from the wire 60 and depositing it in zone 14' or 15'.

Alternatively rod 60 may constitute a tube loaded plurality of individual doses of additive material 66 encapsulated in paper or foil. The rod is positioned so that as it gets hit by a laser pulse, a dose of additive material is released and deposited on the rotor for metallurgical bonding.

The system described herein may be used to balance other types of rotary objects. For example, material may be deposited in the manner described above on the circular surface of a disk.

Preferably the balancing system of FIG. 2 is housed in a chamber containing an inert gas to insure that the additive material is not oxidized during the bonding process.

Obviously numerous modifications may be made to the invention without departing from its scope as defined in the appended claims.

I claim:

1. A dynamic system for balancing a rotary object having a surface, comprising:
   a. support means for rotatably supporting said object;
   b. sensor means for sensing the position of said object;
   c. laser supply means for supplying laser beam pulse impinging on said object;
   d. control means for designating a melt zone on said object, said control means being coupled to said sensor means and said laser supply means for directing said laser beam pulse to said melt zone; and e. supply means for supplying additive material to said melt zone, wherein said additive material is bonded on said melt zone by said laser pulse to form a metallurgical bond with said object for correcting the balance of said object while said object is rotating.

2. The system of claim 1 further comprising balance sensing means for sensing the balance of said object, wherein said control means is coupled to said balance sensing means, said control means including means for calculating the amount of additive material required to correct said balance.

3. The system of claim 2 wherein said balance sensing means comprise vibration sensors for sensing the vibrations of the object due to incorrect balancing.

4. The system of claim 1 wherein said supply means comprises a nozzle assembly for supplying a powder.

5. The system of claim 1 wherein said supply means comprises a wire and means for feeding the wire toward said melt zone.

6. A dynamic system for balancing a rotor having a surface, said system comprising:

a. support means for rotatably supporting said rotor;

b. balance sensing means for sensing the balance of said rotor as said rotor is rotating on said support means, said balance sensing means generating balance indication signals indicative of the balance of said rotor;

c. position sensor means for generating a position signal indicative of the angular position of said rotor, as said rotor is rotating;

d. control means for receiving said balance indication signals and said position indication, said control means including signal processing means for designating at least melt zone on said rotor, and an amount of additive material for depositing on said melt zone to correct the balance of said rotor;

e. laser means coupled to said control means for delivering a laser beam pulse to said melt zone; and f. additive material supply means coupled to said control means for delivering said amount of additive material to said melt zone;

wherein said additive material is melted on said rotor by said laser pulse to form a metallurgical bond with said rotor.

7. The system of claim 6 wherein said balance sensing means comprise vibration sensors for sensing the vibration of said rotor.

8. The system of claim 6 where said additive material supply means comprises a nozzle assembly.

9. The system of claim 8 wherein said nozzle assembly includes a powder reservoir, and an ejection port for selectively ejecting powder to said melt zone.

10. The system of claim 9 where said nozzle assembly includes a gas supply for supplying a gas through said ejection nozzle, said gas entraining powder from said reservoir.

11. The system of claim 6 wherein said additive material supply means comprises a wire, and feeding means for feeding said wire to said melt zone.

* * * * *